INVENTORS.
Donald L. Caldwell
BY William A. Mod

Griswold & Burdick
ATTORNEYS

United States Patent Office 3,573,887
Patented Apr. 6, 1971

3,573,887
METHOD OF MAKING GLASS FROM REACTED AND SHAPED BATCH MATERIALS
William A. Mod and Donald L. Caldwell, Lake Jackson, Tex., assignors to The Dow Chemical Company, Midland, Mich.
Filed Feb. 27, 1968, Ser. No. 708,673
Int. Cl. C03b 1/00
U.S. Cl. 65—18                                                    11 Claims

ABSTRACT OF THE DISCLOSURE

This specification discloses a continuous, batch or semi-batch process for making glass and particularly but not limited to so-called soda-lime glass comprising in a continuous manner preparing a substantially reacted glass making batch wherein an alkali metal hydroxide is employed as a constituent thereof to provide a source of at least 50 percent of the alkali metal flux values in the final glass, forming said batch into a continuous or discontinuous elongated shape, drying said batch so-elongated, and thereafter passing the dried rigid shaped batch into a high temperature zone to rapidly and continuously melt the elongated batch and fine it. The molten glass so made can be solidified or worked into a useful configuration.

BACKGROUND OF THE INVENTION

This invention relates to making glass and more particularly relates to preparing essentially seed-free glass in a near-instantaneous manner.

Current glass-making practice utilizes a large glass melting tank (furnace) in which a glass making batch is melted and fined for up to 48 hours to allow gases to escape and the melt to become homogeneous. The melting tank generally comprises a two-compartment refractory brick lined vessel separated by a baffle which is attached to a ceiling or crown and dips into the pool of molten glass. In one chamber the batch is introduced and heated by various means including jets of ignited glass to melt it, whereupon, the melted material passes the baffle into a second chamber where it is fined to permit release of gas bubbles, etc. Molten fined glass is then withdrawn from the discharge end of the furnace as "gobs" which are then cast or blown or manipulated into a useful shape such as bottles and solidified, or wherein the glass may be drawn from the furnace and formed into sheets. Such a melting tank represents a very large capital expense and a large maintenance problem. Usually, after being in operation for about 2 to 5 years, the facility must be shut down to repair or rebuild it.

A particular maintenance problem encountered in such a furnace results from decrepitation of the calcium carbonate component of the glass batch upon being exposed to the elevated temperatures in the glass making process. Decrepitation is the bursting or popping of the carbonate particle into finer particles due to the extremely rapid calcination or evolution of gasses therefrom. These fine particles are carried by gas streams and flames playing about the furnace into the regenerative checkers where they deposit to plug the checkers. This plugging necessitates at least partial shutdowns so that the checkers may be cleaned, which is a disruptive and time consuming operation. Increased furnace temperatures of course increases the output of glass, however, the furnace life is markedly decreased.

A further problem with respect to gases in the melting furnace is the presence of seeeds or voids in the final glass product which may hinder the usefulness of such product.

The terms "final glass" or "final glass product" as used herein refers to a final glass composition ordinarily used, for example, for windows and bottles having a silica content generally between about 60 and 85 percent by weight, preferably from 68 to 75 percent, and alkali flux values ($Na_2O$ and $K_2O$ primarily) between about 4 and 20 percent, including the so-called "soda lime glasses" having between 10 and 20 percent alkali flux as well as the chemical and heat resistant borosilicate glasses ranging in silica and boric oxide from about 85 to 93 percent and in alkali fluxes from about 4 to about 10 percent, the common stabilizing and modifying oxides, e.g., alumina, calcia, magnesia, and lead oxide essentially making up the remaining constituents.

The term "alkaline earth metal oxide source" as used herein refers to alkaline earth metal compounds which will furnish alkaline earth metal oxide values in the final glass product and includes sources such as limestone, dolomite, calcined limestone, calcined dolomite, $CaCO_3$ and $Ca(OH)_2$.

The term "alkali metal oxide source" as used herein refers to alkali metal compounds which will furnish alkali metal oxide values in the final glass product and includes sources such as sodium hydroxide, potassium hydroxide, sodium carbonate, and potassium carbonate.

In conventional soda-lime glass making practice, a number of finely sized raw materials which make up the glass making batch are weighed, mixed, and transported to the glass melting furnace. The composition of a "batch" in addition to the glass-forming materials, typically contains by weight from about 15 to about 35 percent of an alkali metal carbonate, such as sodium carbonate (soda ash), as a primary source of alkali metal flux oxides in the resulting glass product and sometimes as low as 10 and as high as about 40 percent alkali metal carbonate. The batch also contains alkaline earth metal carbonates typically, calcium carbonate, as CaO-source materials and other stabilizers, in an amount to provide from about 8 to about 14 percent of CaO in the final glass product and preferably 9.5 to 11.5 percent CaO in said product. The balance of the batch is a glass forming material such as silica, and small amounts of other agents designed to impart a particular effect.

A primary object of the present invention is to provide a novel method of making glass wherein the conventional glass melting tank with all its attendant maintenance and operational disadvantages may be eliminated.

Another primary object of the present invention is to provide a novel and unique method of making glass wherein the melting and fining of a glass batch may be accomplished in a matter of minutes as opposed to hours in the conventional method.

A further object of the invention is to provide an extremely rapid method for the melting and fining of soda-lime and borosilicate glass batches to produce a final glass composition substantially free of seeds.

Another object of the invention is to provide a novel method of making glass which can be completely shut down in a matter of a few minutes without a large residual invenory of melted and/or partially melted glass in a furnace.

SUMMARY OF THE INVENTION

In accordance with the present invention the above and other objects and advantages are found in a unique and novel method for making in a rapid manner a final glass product without the need of employing the conventional glass melting furnaces consisting of the following combination of process steps, conditions and limitations. First, a homogeneous glass making raw material batch is prepared containing (a) one or more glass formers such as, e.g., silica sand, (b) a stabilizing, alkaline earth metal oxide source material such as, e.g., a calcium oxide-containing substance such as calcium carbonate, (c) various modifying oxides, and (d) as a source of at least 50 percent of the alkali metal flux values in a final glass product, preferably 100 percent, an alkali metal hydroxide such as, e.g., sodium hydroxide as a 45 to 80 percent aqueous solution thereof. The batch preferably contains an alkaline earth metal source material present in an amount from about 10 to about 40 weight percent, an alkali metal oxide source material in an amount from about 15 to about 35 percent, the balance being at least one glass former. The homogeneous batch is then subjected to a temperature in the range of, e.g., of from about 60° to about 215° C. while concurrently, or subsequently, formed preferably into an elongated shape such as by extrusion or casting into a bar, to cause substantial reaction between the stabilizing oxide source material and the alkali metal hydroxide. In a dried substantially rigid shape, the reacted batch is exposed in a continuous manner to an elevated temperature zone, e.g., greater than 1400° C., where the glass batch is rapidly melted and fined. The molten fined glass may either be worked in the hot condition as received from the high temperature zone into a useful configuration, or solidified and stored for future use. The proccess may be carried out in a batch, semibatch, or continuous manner to prepare in a matter of minutes from a raw composition a final fined glass product, having a very low seed count without the use of a conventional large inventory glass melting tank typically requiring several hours to produce a final glass product from a glass batch.

The present invention will be further understood and illustrated from the accompanying drawings.

In carrying out the present invention, there are various embodiments thereof which may be employed wherein particular changes and modifications may be employed regarding the sequence, consolidation, and addition or deletion of certain process steps.

PREFERRED EMBODIMENTS

Figure 1:
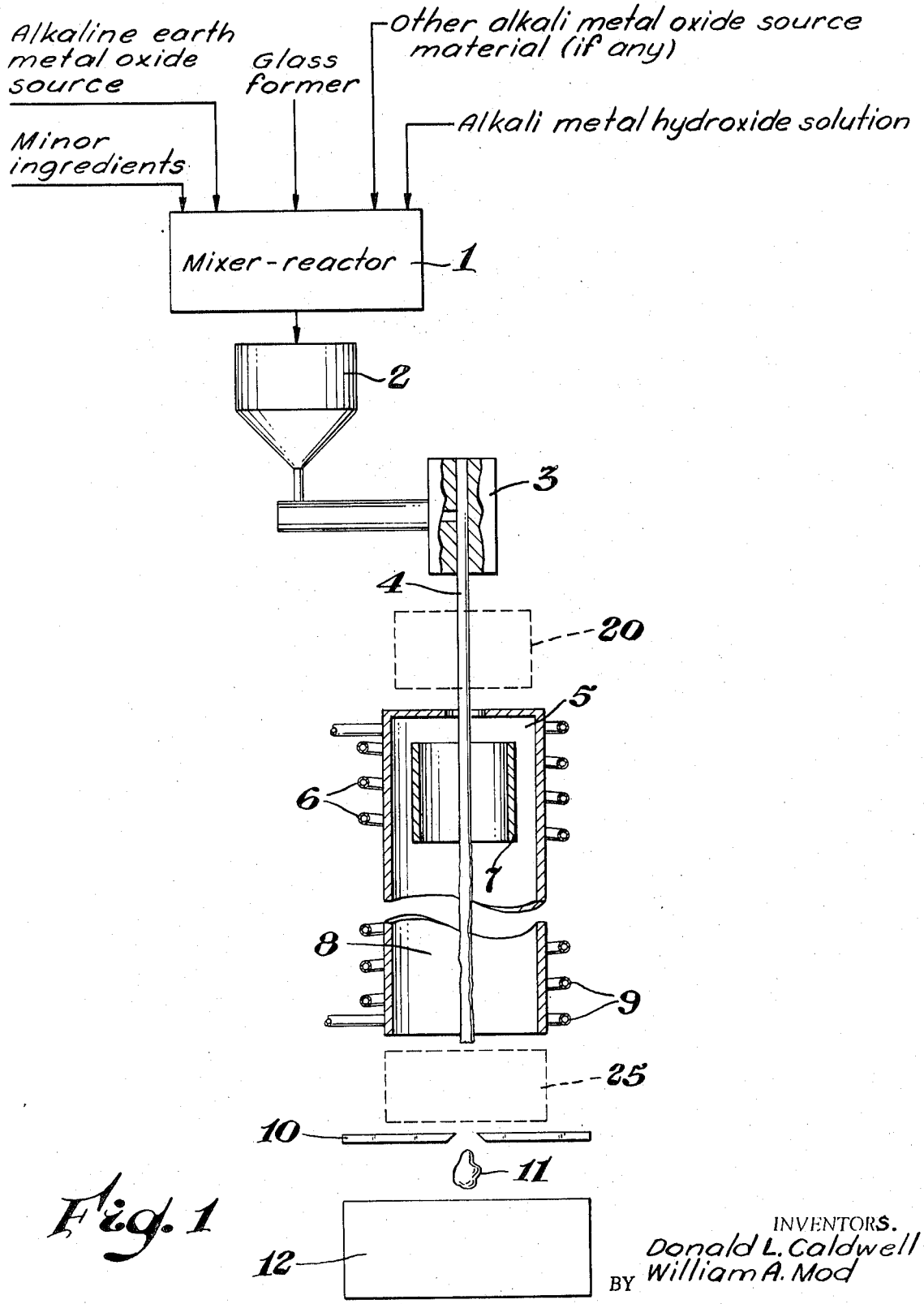
FIG. 1 is a schematic drawing of one embodiment of the present invention.

One particular embodiment of the inventive process consists essentially of the sequence as schematically depicted in FIG. 1 of the drawings. In this embodiment, a glass former, e.g., $SiO_2$; a stabilizing, alkaline earth metal oxide source, e.g., $CaCO_3$, in an amount sufficient to provide from about 8 to 13 percent stabilizing oxide in the final glass product; an aqueous solution of an alkali metal hydroxide, e.g., 45 to 80 percent aqueous solution of NaOH, in an amount sufficient to provide at least 50 percent of the alkali metal oxide in the final glass product; other alkali metal oxide source materials, e.g., $Na_2CO_3$, if necessary, and other conventional minor glass batch constituents are admixed and reacted in a mixer-reactor 1 at about 60 to 215° C. for about 5 to 60 minutes. The reacted mixture is discharged into a feed hopper 2 from which it is fed into a glass extruder 3 where the mixture is extruded into continuous or discontinuous elongated shaped, e.g., bars or rods 4. These solidified shapes or pieces 4 are fed into a hot zone 5 maintained at a temperature within the range of 1600 to 1700° C. by induction coils 6 and susceptor 7, i.e., conductor, or similar heating means, e.g., an oxygen-methane burner. Optionally, the solidified pieces may be dried by a conventional dryer 20 and stored prior to further processing. Since the upper end of the hot zone acts as a dryer, a separate dryer is unnecessary where a continuous process is employed. The elongated pieces 4 melt and fine in the hot zone 5 in a matter of seconds producing a homogeneous glass melt. Optionally, the melt may be cooled, e.g., about 1200° C. in a cooling zone 8 using cooling coils 9 or other conventional cooling means. The molten glass is cut into modules of gobs 11 by shears 10 or other cutting means and fed to a utilization device 12, e.g., bottle or other container-making apparatus. Alternatively, the molten glass can be fed, e.g., into a single or multiple opening orifice to produce glass fibers or strands. Optionally, the molten glass can be collected in a reservoir 25 prior to use.

Figure 2:
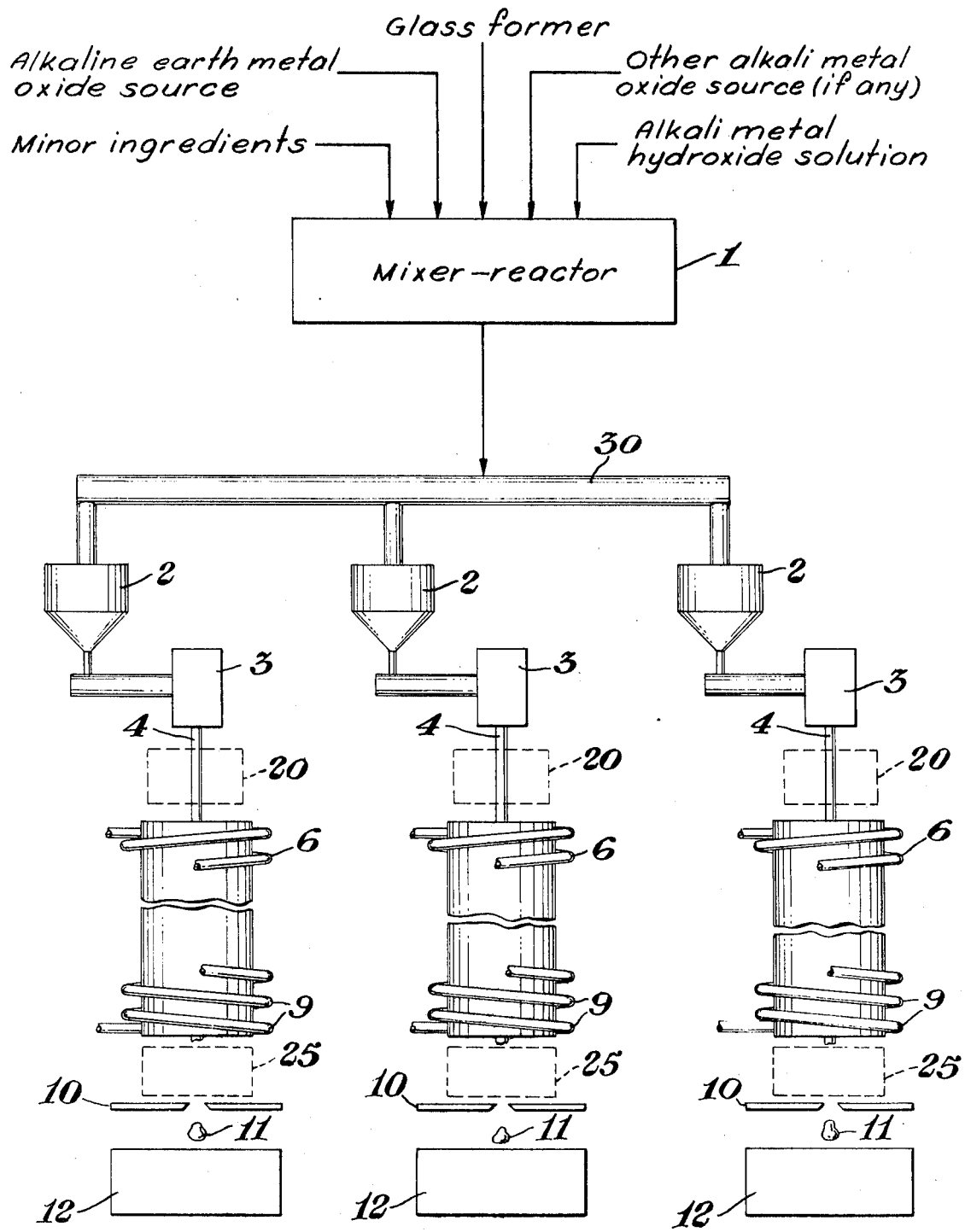
FIG. 2 is a schematic drawing of another embodiment of the present invented method.

Another embodiment of the method of the present invention is depicted in FIG. 2. The reacted mixture as heretofore defined in connection with FIG. 1 is fed into a manifold 30 which feeds the mixture to one or more feed hoppers 2, depending on production requirements. The glass mixture is then processed as previously explained with respect to FIG. 1 and the accompanying discussion.

As can be readily seen from the drawings and the above description the process of the present invention permits rapid glass manufacture without large residual melted glass and without the need for the conventional melting tank, thereby avoiding such problems as periodic shutdowns for cleaning necessitated by decrepitation as heretofore explained.

The following example is representative of the method of the present invention but is not intended to be limited thereto.

EXAMPLE

Dry ingredients of a commercial-type soda-lime glass batch were weighed as follows:

| | Grams |
|---|---|
| Sand | 296.25 |
| Feldspar | 37.25 |
| Limestone | 77.50 |
| Total | 411.00 |

The ingredients were thoroughly mixed and brought to a temperature of 60° C. and 156.5 grams of commercial grade 50% NaOH aqueous solution was added. The mixing was continued for about 25 minutes and brought to a temperature of 70° C. The moist batch was cast into 3/16" diameter rods by packing into small metal tubes about 6" long. The so-cast rods were further reacted and dried by heating at 80° C. The rods were removed from the molds and were suspended so the lower end of the rods (one at a time) could be lowered through the center of a one inch ring of an oxygen-natural gas burner, providing a temperature in excess of 1400° C. As each rod was fed into the hot zone, the batch melted within seconds and beads of glass were formed which could be drawn off as strands, cut off as small lumps, or allowed to fall as beads.

In like manner any conventional soda-lime or borosilicate glass batch having as at least a 50 percent alkali metal oxide source an alkali metal hydroxide, e.g., NaOH or KOH, may be processed according to the method of the present invention to produce an essentially seed-free final glass product.

As heretofore described, the method of the present invention permits continuous, near-instantaneous glass manufacture without the use of conventional glass tank equipment thereby eliminating conventional maintenance and operational disadvantages.

Various modifications can be made in the present invention without departing from the scope or spirit thereof, for it is to be understood that the invention is limited only as defined in the appended claims.

What is claimed is:

1. A method of making glass which comprises:
    (a) reacting a homogeneous raw materials glass batch containing at least one glass former selected from the group consisting of silica and boric oxide sources, an alkaline earth metal oxide source material, and an alkali metal oxide source material, said alkali metal oxide source material containing an alkali metal hydroxide selected from the group consisting of sodium hydroxide and potassium hydroxide in an amount sufficient to provide at least 50% of the alkali metal oxide value in the glass; said reaction carried out at a temperature of from about 60° C. to about 215° C. for a time sufficient to substantially react the alkaline earth metal oxide source with the alkali metal hydroxide;

(b) forming an elongated shape of said reacted glass batch; suspending said elongated shape in a vertical orientation, and (c) continuously passing a lower end of said suspended elongated glass batch shape downwardly through a hot zone having a temperature of at least 1400° C., thereby producing a molten, fined glass from said lower end of said suspended glass batch.

2. The method of claim 1 wherein the alkali metal hydroxide is present as about a 45 to 80 percent aqueous solution.

3. The method of claim 1 wherein the alkaline earth metal source material is present in an amount of from about 10 to about 40 weight percent, the alkali metal oxide source material being from about 15 to about 35 weight percent, the balance being at least one glass former.

4. The method of claim 1 wherein in step (c) the temperature in the hot zone is within the range of from about 1600° C. to 1700° C.

5. The method of claim 1 wherein the alkali metal hydroxide is a 100 percent source of the alkali metal oxide value on the final glass product.

6. The method of claim 1 wherein the alkali metal hydroxide is sodium hydroxide.

7. The method of claim 1 wherein in step (a) the batch is reacted for from about 5 to about 60 minutes.

8. The method of claim 1 wherein in step (b) the reacted glass batch is formed into an elongated shape by extrusion.

9. The method of claim 1 wherein the elongated shape is formed by casting the glass batch into a rod.

10. The method of claim 1 wherein in step (c) the hot zone comprises induction heating coils and a susceptor.

11. The method of claim 1 wherein in step (c) the hot zone comprises an oxygen-methane burner.

References Cited

UNITED STATES PATENTS

| 2,838,882 | 6/1958 | Silverman | 65—18X |
| 3,234,034 | 2/1966 | Jasinski et al. | 106—52X |
| 3,451,831 | 6/1969 | Miche | 106—52 |

FOREIGN PATENTS

| 670,974 | 9/1963 | Canada | 65—18 |

S. LEON BASHORE, Primary Examiner

J. B. HARDAWAY, Assistant Examiner

U.S. Cl. X.R.

65—27, 134; 106—52